(12) United States Patent
Beak et al.

(10) Patent No.: US 9,851,993 B2
(45) Date of Patent: Dec. 26, 2017

(54) VIRTUAL MACHINE TEMPLATE OPTIMIZATION

(71) Applicant: International Business Machines Corporation, Armonk, NY (US)

(72) Inventors: Wunchon Beak, Chelmsford, MA (US); James E. Bostick, Cedar Park, TX (US); John M. Ganci, Jr., Cary, NC (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 14/034,721

(22) Filed: Sep. 24, 2013

(65) Prior Publication Data
US 2015/0089494 A1    Mar. 26, 2015

(51) Int. Cl.
*G06F 9/455* (2006.01)

(52) U.S. Cl.
CPC ............ *G06F 9/45558* (2013.01); *G06F 2009/45562* (2013.01)

(58) Field of Classification Search
USPC ............................................. 703/27
See application file for complete search history.

(56) References Cited

U.S. PATENT DOCUMENTS

| | | | |
|---|---|---|---|
| 6,363,524 B1 * | 3/2002 | Loy ............... | G06F 8/65 717/127 |
| 7,603,670 B1 * | 10/2009 | van Rietschote .... | G06F 9/4856 718/1 |
| 8,181,174 B2 * | 5/2012 | Liu .................. | G06F 9/44505 717/121 |
| 8,205,194 B2 * | 6/2012 | Fries .............. | G06F 8/65 717/168 |
| 8,327,350 B2 * | 12/2012 | Chess ............. | G06F 9/5077 717/174 |
| 8,468,518 B2 * | 6/2013 | Wipfel ............ | G06F 8/61 717/168 |

(Continued)

FOREIGN PATENT DOCUMENTS

WO    2013035904 A1    3/2013

OTHER PUBLICATIONS

Vasiliev et al. ("How to Use Oracle VM Templates", Oracle Tectmology Network, Jun. 2012).*

(Continued)

*Primary Examiner* — Omar Fernandez Rivas
*Assistant Examiner* — Iftekhar Khan
(74) *Attorney, Agent, or Firm* — Nicholas L. Cadmus; Maeve Carpenter (57) ABSTRACT

In an approach for optimizing a virtual machine (VM) operating system (OS) template, one or more processors obtain a list of packages in an existing VM template. The processors obtain a list of packages required to be included in the existing VM template. The processors determine differences between the list of packages in the existing VM template and the list of packages required to be included in the existing VM template. The processors update the existing VM template based on the determined differences between the list of packages in the existing VM template and the list of packages required to be included in the existing VM template.

17 Claims, 3 Drawing Sheets

(56) References Cited

U.S. PATENT DOCUMENTS

| | | | | |
|---|---|---|---|---|
| 8,990,809 B1* | 3/2015 | Jacob | G06F 9/45533 | 718/1 |
| 2006/0080651 A1* | 4/2006 | Gupta | G06F 8/68 | 717/169 |
| 2009/0132526 A1 | 5/2009 | Park | | |
| 2009/0216975 A1* | 8/2009 | Halperin | G06F 9/45537 | 711/162 |
| 2009/0300641 A1* | 12/2009 | Friedman | G06F 11/3664 | 718/104 |
| 2010/0122248 A1* | 5/2010 | Robinson | G06F 9/485 | 718/1 |
| 2010/0235828 A1* | 9/2010 | Nishimura | G06F 8/63 | 717/174 |
| 2010/0235831 A1* | 9/2010 | Dittmer | G06F 9/45558 | 718/1 |
| 2010/0257523 A1* | 10/2010 | Frank | G06F 9/45558 | 718/1 |
| 2011/0004676 A1* | 1/2011 | Kawato | G06F 9/5044 | 709/221 |
| 2011/0138383 A1* | 6/2011 | Le | G06F 9/5077 | 718/1 |
| 2011/0153697 A1* | 6/2011 | Nickolov | G06F 9/4856 | 707/827 |
| 2011/0154320 A1* | 6/2011 | Verma | G06F 8/63 | 718/1 |
| 2011/0173605 A1* | 7/2011 | Bourne | G06F 8/71 | 717/176 |
| 2011/0239214 A1 | 9/2011 | Frields et al. | | |
| 2011/0246985 A1* | 10/2011 | Zhou | G06F 9/445 | 718/1 |
| 2012/0084775 A1* | 4/2012 | Lotlikar | G06F 9/45558 | 718/1 |
| 2012/0131577 A1* | 5/2012 | Arcese | G06F 8/60 | 718/1 |
| 2012/0240110 A1* | 9/2012 | Breitgand | G06F 9/45558 | 718/1 |
| 2012/0246645 A1* | 9/2012 | Iikura | G06F 8/61 | 718/1 |
| 2013/0152047 A1* | 6/2013 | Moorthi | G06F 11/368 | 717/124 |
| 2013/0152080 A1* | 6/2013 | Sachindran | G06F 9/44526 | 718/1 |
| 2013/0232480 A1* | 9/2013 | Winterfeldt | G06F 8/60 | 717/177 |
| 2013/0275596 A1* | 10/2013 | Subramaniam | H04L 41/04 | 709/226 |
| 2013/0311990 A1* | 11/2013 | Tang | G06F 9/45558 | 718/1 |
| 2014/0137114 A1* | 5/2014 | Bolte | G06F 9/45533 | 718/1 |
| 2014/0201725 A1* | 7/2014 | Tian | G06F 8/63 | 717/169 |
| 2014/0282519 A1* | 9/2014 | Apte | G06F 9/45533 | 718/1 |

OTHER PUBLICATIONS

Assuncao et al.("Harnessing Cloud Technologies for a Virtualized Distributed Computing Infrastructure" IEEE,2009).*

Orcale Technical White Paper—Feb. 2009, pp. 1-26.*

Buzzetti et al., "Deploying a Cloud on IBM System z", International Technical Support Organization, Feb. 2011, REDP-4711-00, <ibm.com/redbooks>.

Chang-Yen et al., "Deploying Virtual Clusters through P2P-based Content Distribution", 2012 IEEE 11th International Symposium on Network Computing and Applications, Center for Advanced Computer Studies, The Univeristy of Louisiana at Lafayette, Lafayette LA, US., pp. 167-170, 978-0-7695-4773-2/12 copyright 2012 IEEE, DOI 10.1109/NCA 2012.47.

Smith, "IBM System x Private Cloud Offering, Advanced Configuration: Architecture and Implementation Guide", Redpaper, IBM, 2011, REDP-4771-00, IBM, REDP-477-00, Jul. 22, 2011, pp. 1-42, copyright IBM Corp. 2011, <ibm.com/redbooks>.

* cited by examiner

VIRTUAL MACHINE TEMPLATE OPTIMIZATION

TECHNICAL FIELD

The present invention relates generally to the field of computer system design, and more particularly to virtual machine image or template build.

BACKGROUND

In system virtualization, multiple virtual systems are created within a single physical system. The physical system can be a stand-alone computer, or alternatively, a computing system utilizing clustered computers and components. Virtual systems are independent operating environments that use virtual resources made up of logical divisions of physical resources such as processors, memory and input/output (I/O) adapters. This system virtualization is implemented through some managing functionality, typically hypervisor technology. Hypervisors, also called virtual machine managers (VMMs), use a thin layer of code in software or firmware to achieve fine-grained, dynamic resource sharing. Because hypervisors provide the greatest level of flexibility in how virtual resources are defined and managed, they are the primary technology for system virtualization.

Within a cloud computing environment there are typically multiple virtual machine (VM) operating system (OS) templates used for building a new VM image as method of rapid system deployment. VM templates may include different operating systems, versions, and architectures (e.g. 32 or 64 bit). The operating system files are managed using a package management system. A package management system is a collection of software tools to automate the process of installing, upgrading, configuring, and removing software packages for a computer's operating system in a consistent manner. The VM OS template is used as a starting point to install middleware and application software. Each application or software product may require prerequisite packages.

SUMMARY

An approach for optimizing a virtual machine (VM) operating system (OS) template is described. One or more processors obtain a list of packages in an existing VM template. The one or more processors obtain a list of packages required to be included in the existing VM template. The one or more processors determine differences between the list of packages in the existing VM template and the list of packages required to be included in the existing VM template. The one or more processors update the existing VM template based on the determined differences between the list of packages in the existing VM template and the list of packages required to be included in the existing VM template.

A first aspect of the present invention discloses a method for optimizing a virtual machine (VM) operating system (OS) template. One or more processors obtain a list of packages in an existing VM template. The one or more processors obtain a list of packages required to be included in the existing VM template. The one or more processors determine differences between the list of packages in the existing VM template and the list of packages required to be included in the existing VM template. The one or more processors update the existing VM template based on the determined differences between the list of packages in the existing VM template and the list of packages required to be included in the existing VM template.

A second aspect of the present invention discloses a computer program product for optimizing a virtual machine (VM) operating system (OS) template. The computer program product includes one or more computer-readable storage media and program instructions that are stored on the one or more computer-readable storage media. The program instructions include obtaining a list of packages in an existing VM template. The program instructions include obtaining a list of packages required to be included in the existing VM template. The program instructions include determining differences between the list of packages in the existing VM template and the list of packages required to be included in the existing VM template. The program instructions include updating the existing VM template based on the determined differences between the list of packages in the existing VM template and the list of packages required to be included in the existing VM template.

A third aspect of the present invention discloses a computer system for optimizing a virtual machine (VM) operating system (OS) template. The computer system comprising one or more computer processors and/or one or more computer-readable storage media wherein the program instructions are stored on the computer-readable storage media for execution by at least one of the one or more processors. The program instructions comprise obtaining a list of packages in an existing VM template. The program instructions comprise obtaining a list of packages required to be included in the existing VM template. The program instructions comprise determining differences between the list of packages in the existing VM template and the list of packages required to be included in the existing VM template. The program instructions comprise updating the existing VM template based on the determined differences between the list of packages in the existing VM template and the list of packages required to be included in the existing VM template.

DETAILED DESCRIPTION

A virtual machine (VM) build specialist utilizes operating system (OS) templates as a starting point for a VM image build. The templates must be maintained to assure the manifest, or list, of software packages within the template is complete and up to date. Often, additional middleware and/or application software packages are required to be included in the template. If there are any dependency packages that are a prerequisite for the additional middleware and/or software packages, the prerequisite packages must be added to the template, if they are not already present. In an effort to reduce cost and increase operational efficiency, the number of VM OS templates is kept to a minimum set of OS packages to reduce security exposure and cost of maintenance. For this reason, build specialists attempt to find a least common denominator of OS packages for a given OS in a VM template that can be shared by many middleware products and applications. The process of determining the least common denominator of required OS packages for the middleware and application prerequisites creates an optimized template. However, the process is often manual, tedious and costly.

Embodiments of the present invention recognize efficiency could be gained if the process of determining the least common denominator prerequisite packages was automated. Embodiments of the present invention determine what prerequisite packages are required by the VM OS template and update the template accordingly. Implementation of embodiments of the invention may take a variety of forms, and exemplary implementation details are discussed subsequently with reference to the Figures.

As will be appreciated by one skilled in the art, aspects of the present invention may be embodied as, inter alia, a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code/instructions embodied thereon.

Any combination of computer readable storage media may be utilized. A computer readable storage medium may be, for example, but not limited to, an electronic, magnetic, optical, or semiconductor system, apparatus, or device, or any suitable combination of the foregoing. More specific examples (a non-exhaustive list) of a computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java® (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
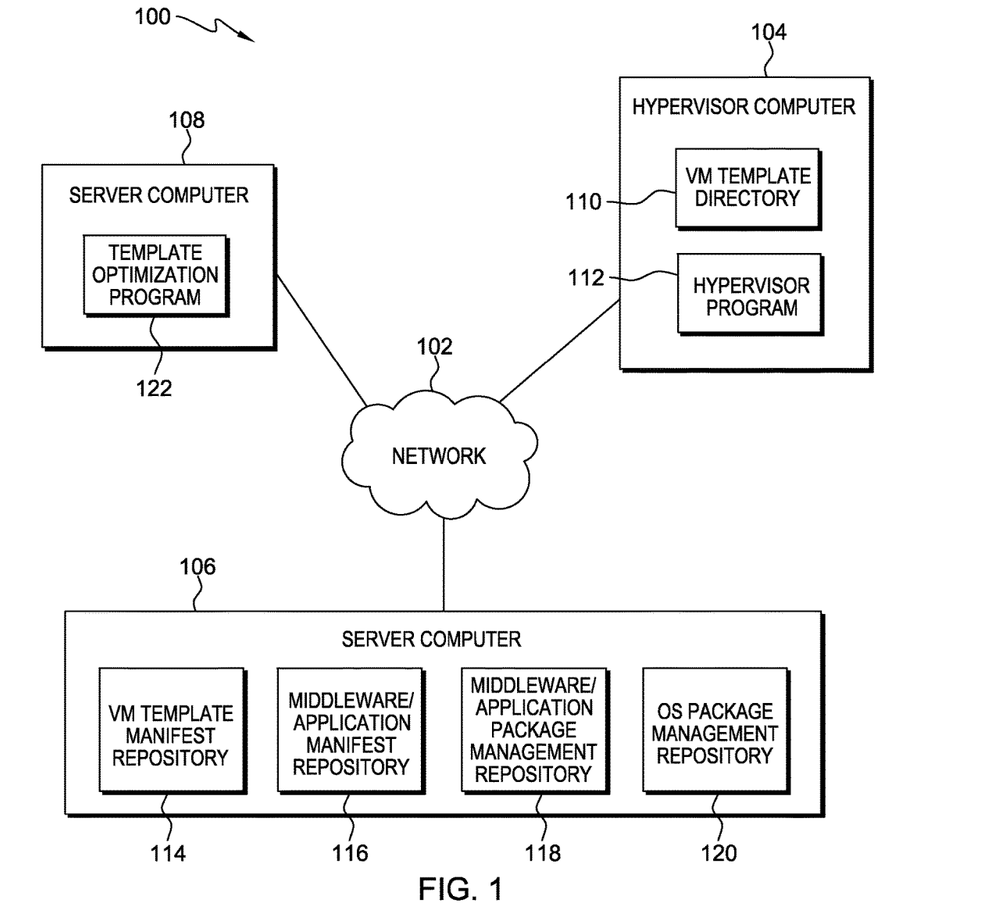
FIG. 1 is a functional block diagram illustrating a computing system environment, in accordance with an embodiment of the present invention.

The present invention will now be described in detail with reference to the Figures. FIG. 1 is a functional block diagram illustrating a computing system environment, generally designated 100, in accordance with an embodiment of the present invention. FIG. 1 provides only an illustration of one implementation and does not imply any limitations with regard to the environments in which different embodiments may be implemented. Many modifications to the depicted environment may be made.

In the illustrated embodiment, computing system environment 100 includes hypervisor computer 104, server computer 106, and server computer 108, all interconnected over network 102. Network 102 can be, for example, a local area network (LAN), a wide area network (WAN) such as the Internet, or a combination of the two, and can include wired, wireless, or fiber optic connections. In general, network 102 can be any combination of connections and protocols that will support communications between hypervisor computer 104, server computer 106, and server computer 108.

Hypervisor computer 104 may be a laptop computer, tablet computer, netbook computer, personal computer (PC), a desktop computer, a personal digital assistant (PDA), a smart phone, or any programmable electronic device capable of communicating with server computer 106 and server computer 108 via network 102. In another embodiment, hypervisor computer 104 represents a computing system utilizing clustered computers and components to act as a single pool of seamless resources. Hypervisor computer 104 may include components as depicted and described in further detail with respect to FIG. 3. Hypervisor computer 104 includes VM template directory 110 and hypervisor program 112.

Server computer 106 may be a management server, a web server, or any other electronic device or computing system capable of receiving and sending data. In other embodiments, server computer 106 may represent a server computing system utilizing multiple computers as a server system, such as in a cloud computing environment. In another embodiment, server computer 106 may be a laptop computer, tablet computer, netbook computer, personal computer (PC), a desktop computer, a personal digital assistant (PDA), a smart phone, or any programmable electronic device capable of communicating with hypervisor computer 104 and server computer 108 via network 102. In another embodiment, server computer 106 represents a computing system utilizing clustered computers and components to act as a single pool of seamless resources. Server computer 106 may include components as depicted and described in further detail with respect to FIG. 3. Server computer 106 includes VM template manifest repository 114, middleware/application manifest repository 116, middleware/application package management repository 118 and OS package management repository 120.

Server computer 108 may be a management server, a web server, or any other electronic device or computing system capable of receiving and sending data. In other embodiments, server computer 108 may represent a server computing system utilizing multiple computers as a server system, such as in a cloud computing environment. In another embodiment, server computer 108 may be a laptop computer, tablet computer, netbook computer, personal computer (PC), a desktop computer, a personal digital assistant (PDA), a smart phone, or any programmable electronic device capable of communicating with hypervisor computer 104 and server computer 106 via network 102. In another embodiment, server computer 108 represents a computing system utilizing clustered computers and components to act as a single pool of seamless resources. Server computer 108 may include components as depicted and described in further detail with respect to FIG. 3. Server computer 108 includes template optimization program 122.

VM template directory 110 resides on hypervisor computer 104. In other embodiments, VM template directory 110 may reside on any other computing device that is accessible to template optimization program 122. In an embodiment, VM template directory 110 is in a database. In another embodiment, VM template directory 110 is in a file system. VM template directory 110 contains templates for one or more VM operating systems. The package manifest list for each template is located in VM template directory 110. The package manifest list establishes the baseline of OS packages that exist within each template. OS packages are distributions of software, applications and data. Packages also contain metadata, such as the software's name, description of its purpose, version number, vendor, and a list of dependencies necessary for the software to run properly. An example of an OS package is an RPM package used by Redhat Package Manager (RPM) in Linux® systems. (Linux is a registered trademark of Linus Torvalds in the United States, other countries, or both.)

Hypervisor program 112 resides on hypervisor computer 104. In other embodiments, hypervisor program 112 may reside on any other computing device that is accessible to VM template directory 110. A hypervisor is also known as a virtual machine monitor (VMM). In one embodiment, hypervisor program 112 is a piece of computer software that creates and runs virtual machines. In another embodiment, hypervisor program 112 may be firmware or hardware that creates and runs virtual machines. Examples of hypervisors include IBM® PowerVM®, VMware ESXi, Redhat KVM and Microsoft® Hyper-V, Citrix Xen. (IBM and PowerVM are trademarks of International Business Machines Corporation, registered in many jurisdictions worldwide. Microsoft is a trademark of Microsoft Corporation in the United States, other countries, or both.)

VM template manifest repository 114 is a repository that resides on server computer 106. In other embodiments, VM template manifest repository 114 may reside on any other computing device that is accessible to template optimization program 122. In an embodiment, VM template manifest repository 114 may be a database, whereas in another embodiment, VM template manifest repository 114 may be a file system. Template optimization program 122 stores a baseline VM template package manifest for the template under analysis in VM template manifest repository 114 for access when template optimization program 122 executes.

Middleware/application manifest repository 116 is a repository that resides on server computer 106. In other embodiments, middleware/application manifest repository 116 may reside on any other computing device that is accessible to template optimization program 122. In an embodiment, middleware/application manifest repository 116 may be a database, whereas in another embodiment, middleware/application manifest repository 116 may be a file system. Template optimization program 122 stores a list of prerequisite OS packages for any new middleware or software applications that are required to be included in the VM OS template that template optimization program 122 is analyzing in middleware/application manifest repository 116.

Middleware/application package management repository 118 resides on server computer 106. In other embodiments, middleware/application package management repository 118 may reside on any other computing device that is accessible to template optimization program 122. A package management system is a collection of software tools to automate the process of installing, upgrading, configuring, and removing software packages for a computer's operating system in a consistent manner. A package management system typically maintains a package management repository of software dependencies and version information to prevent software mismatches and missing prerequisites. An example of a package management repository is a Yellowdog Updater Modified (YUM) repository used in Linux systems. YUM adds automatic updates and package management, including dependency management, to RPM systems. In addition to understanding the installed packages on a system, YUM works with repositories, which are collections of packages, typically accessible over a network connection. Middleware/application package management repository 118 stores the packages for each middleware and software application. Template optimization program 122 accesses middleware/application package management repository 118 to obtain a list of prerequisite OS packages associated with the middleware and/or application software that may be added to the VM template that template optimization program 122 is analyzing.

OS package management repository 120 is a repository that resides on server computer 106. In other embodiments, OS package management repository 120 may reside on any other computing device that is accessible to template optimization program 122. In an embodiment, OS package management repository 120 may be a database, whereas in another embodiment, OS package management repository 120 may be a file system. As described above, an example of a package management system repository is a YUM repository. OS package management repository 120 stores the various operating system packages that may be needed in the VM templates.

Template optimization program 122 executes on server computer 108. In other embodiments, template optimization program 122 may reside on any other computing device that is accessible to hypervisor computer 104 and server computer 106. Template optimization program 122 draws data from hypervisor computer 104 and server computer 106 in order to optimize VM OS templates. Template optimization program 122 optimizes VM OS templates by creating a template that has the least common denominator of required OS packages. Template optimization program 122 creates a list of prerequisite OS packages required for new middleware and/or software applications from the plurality of repositories residing on server computer 106 and determines whether the existing VM OS template requires updating to include the prerequisite OS packages. One implementation of template optimization program 122 is described in further detail with respect to FIG. 2.

Figure 2:
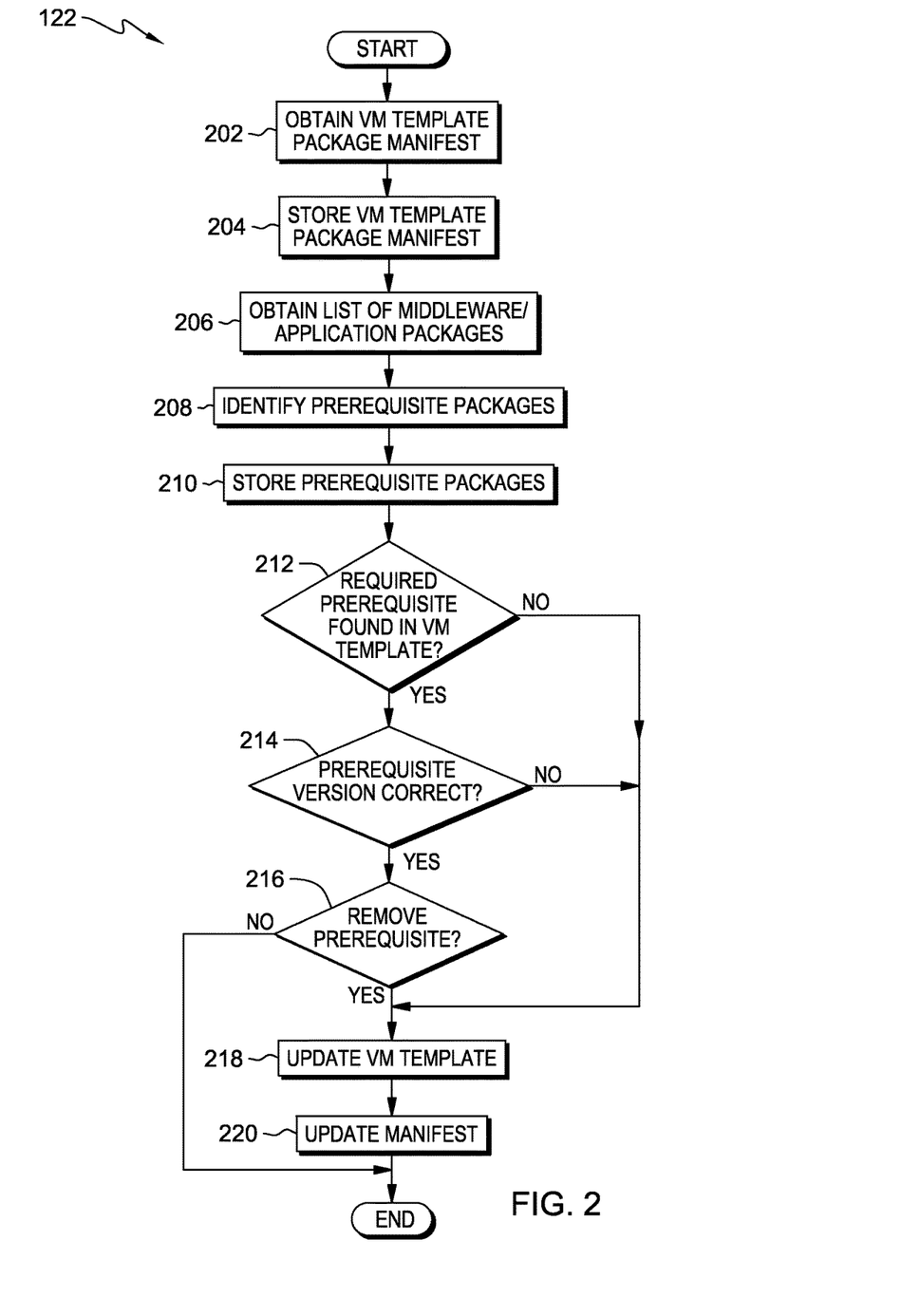
FIG. 2 is a flowchart depicting operational steps of a template optimization program, in accordance with an embodiment of the present invention.

FIG. 2 is a flowchart depicting operational steps of template optimization program 122 for optimizing a VM OS template and the associated package manifest in the VM template used for image build, in accordance with an embodiment of the present invention.

The build of the VM template is a routine task that a build specialist performs on a regular basis to assure that the template is up to date and ready for the next use. As needed, the build specialist opens the build management tool, and initiates template optimization program 122 to optimize the template. In another embodiment, template optimization may be an automated task such that if something new is added to the template, for example new middleware or a new software application, the optimization process automatically initiates. Optimization consists of confirming that all required software packages, and associated prerequisite OS packages are included in the template, as well as confirming that required packages are the correct version, and that there are no unneeded packages. Once the VM templates are optimized, the VM templates are copied to hypervisor computer 104 and made available for use in creating new VMs built from the VM template. An example of optimizing a template that requires applications X, Y and Z follows.

In response to a new requirement, a build specialist determines that a VM OS template requires the addition of applications X, Y and Z. In an example data set, application X has the following package prerequisites: package 1 (version 2), package 2 and package 3. In addition, package 2has a prerequisite of package 11, and package 11 has a prerequisite of package 27.

Application Y has the following package prerequisites: package 1 (version 2), package 2, package 4 and package 6. As mentioned above, package 2 has a prerequisite of package 11, and package 11 has a prerequisite of package 27. In addition, package 4 has a prerequisite of package 20.

Application Z has the following package prerequisites: package 1 (version 2), package 4 and package 7. As mentioned above, package 4 has a prerequisite of package 20.

In order to optimize the template, all required packages, including prerequisites, must be included in the template and in the manifest. In this example, an optimized template includes the following packages: 1 (version 2), 2, 3, 4, 6, 7, 11, 20 and 27.

Template optimization program 122 obtains a VM template package manifest for the template to be optimized from VM template directory 110 on hypervisor computer 104 (step 202). The VM template package manifest is a list of software packages in the existing version of the OS template. Referring to the previous example, the VM template package manifest includes a list of software packages in the existing version of the VM template for building a VM that currently does not include applications Y and Z. The existing version of the VM template does, however, include application X that requires prerequisite package 1 (version 1). The existing version of the VM template also includes application A that requires prerequisite package 25. The VM template package manifest establishes the baseline of OS packages that exist in the existing version of the template.

Template optimization program 122 stores the VM template package manifest in VM template manifest repository 114 on server 120 (step 204). The VM template package manifest is stored for later access for a comparison.

Template optimization program 122 obtains a list of middleware and/or application packages required for the latest VM template from middleware/application package management repository 118 (step 206). In the previous example, the list of middleware/application packages required for the latest VM template includes applications X, Y and Z. Each middleware and/or application package has a defined list of prerequisite OS packages that are also required to be included in the VM template.

Template optimization program 122 identifies the prerequisite OS packages of each of the middleware and/or application package in the list (step 208). In the previous example, the list of prerequisite OS packages for these applications is 1 (version 2), 2, 3, 4, 6, 7, 11, 20 and 27.

In the illustrated embodiment, the identification of the prerequisite OS packages is performed on a full list of required middleware and/or application packages at once. In another embodiment, the identification of prerequisite OS packages is a recursive step and is executed as many times as necessary to evaluate the prerequisite OS packages of each middleware and/or application package. Subsequent to identifying the prerequisite OS packages, template optimization program 122 stores a list of the prerequisite OS packages in middleware/application package management repository 118 (step 210).

Template optimization program 122 determines whether the required middleware and/or application prerequisite OS packages are found in the VM template package manifest in VM template manifest repository 114 (decision block 212). If the required middleware and/or application prerequisite OS packages are not found in the VM template package manifest in VM template manifest repository 114 (no branch, decision block 212), template optimization program 122 updates the VM template to include the required middleware and/or application prerequisite OS packages (step 218). In one embodiment, template optimization program 122 compares the list of middleware and/or application prerequisite OS packages to the VM template package manifest to determine whether there are any differences between the two lists. From the previous example, if template optimization program 122 determines that package 2 is not in the existing VM template package manifest, template optimization program 122 updates the VM template to include package 2. Template optimization program 122 updates the template by pulling the required OS packages from OS package management repository 120 and updating the VM template OS packages over network 102. Subsequent to updating the template, template optimization program 122 proceeds to step 220.

If the required middleware and/or application prerequisite OS packages are found in the VM template package manifest in VM template manifest repository 114 (yes branch, decision block 212), template optimization program 122 determines whether the prerequisite OS packages in the VM template package manifest are the correct version (decision block 214). In one embodiment, template optimization program 122 queries the VM template package manifest for the package version number and determines whether the package version number in the manifest matches the package version number of the required prerequisite package. If the prerequisite OS packages in the VM template package manifest are not the correct version (no branch, decision block 214), template optimization program 122 updates the VM template by replacing the incorrect versions of the prerequisite OS packages with the correct versions of the prerequisite OS packages (step 218). From the previous example, template optimization program 122 determines that the version of package 1 in the existing VM template package manifest is version 1, however, the required prerequisite OS package is version 2, and therefore, a template update is required. Template optimization program 122 updates the template by pulling the correct version of the packages from OS package management repository 120 and sending them to hypervisor computer 104 for addition to VM template directory 110. After updating the template, template optimization program 122 proceeds to step 220.

If the prerequisite OS packages in the VM template are the correct version (yes branch, decision block 214), template optimization program 122 determines whether to remove any prerequisite OS packages are no longer needed in the VM template (decision block 216). If a particular middleware or application software package is no longer needed in the VM template (yes branch, decision block 216), template optimization program 122 updates the VM template to remove the prerequisite OS packages that are no longer needed (step 218). From the previous example, the comparison of the VM template package manifest to the list middleware/application prerequisite OS packages indicates application A and the associated prerequisite package 25 are no longer required, and therefore, template optimization program 122 removes package 25 from the template and stores the new template in VM template directory 110. If the prerequisite OS packages are still needed in the VM template (no branch, decision block 216), template optimization program 122 makes no update to the VM template and proceeds to step 220.

Subsequent to updating the VM template (see step 218), template optimization program 122 updates the VM template package manifest to reflect any changes that resulted from steps 212, 214 and/or 216, and stores the updated VM template package manifest in VM template directory 110 (step 220). In one embodiment, template optimization program 122 updates the VM template package manifest by sending the changes to hypervisor program 112, and hypervisor program 112 makes the update to VM template directory 110. In another embodiment, template optimization program 122 updates VM template directory 110 directly.

Figure 3:
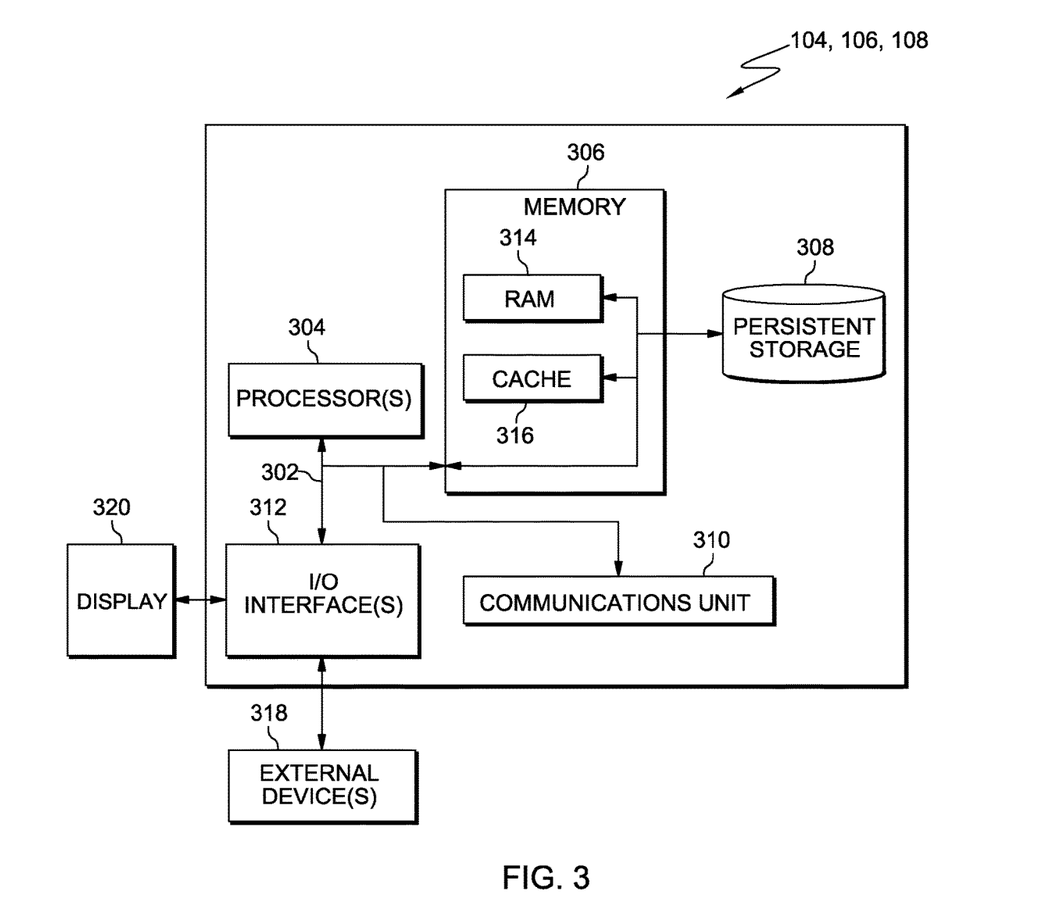
FIG. 3 depicts a block diagram of components of the server computers and hypervisor of FIG. 1, in accordance with an embodiment of the present invention.

FIG. 3 depicts a block diagram of components of hypervisor computer 104, server computer 106 and server computer 108 in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Hypervisor computer 104, server computer 106 and server computer 108 each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In an embodiment, memory 306 includes random access memory (RAM) 314 and cache memory 316. In general, memory 306 can include any suitable volatile or non-volatile computer-readable storage media.

VM template directory 110 and hypervisor program 112 are stored in memory 306 or persistent storage 308 of hypervisor computer 104 for execution and/or access by one or more of the respective computer processors 304 of hypervisor computer 104 via one or more memories of memory 306 of hypervisor computer 104. VM template manifest repository 114, middleware/application manifest repository 116, middleware/application package management repository 118 and OS package management repository 120 are stored in memory 306 or persistent storage 308 of server computer 106 for access by one or more of the respective computer processors 304 of server computer 106 via one or more of the memories of memory 306 of server computer 106. Template optimization program 122 is stored in memory 306 or persistent storage 308 of server computer 108 for execution by one or more of the respective computer processors 304 of server computer 108 via one or more memories of memory 306 of server computer 108. In this embodiment, persistent storage 308 includes a magnetic hard disk drive. Alternatively, or in addition to a magnetic hard disk drive, persistent storage 308 can include a solid state hard drive, a semiconductor storage device, a read-only memory (ROM), an erasable programmable read-only memory (EPROM), a flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. VM template directory 110 and hypervisor program 112 may be downloaded to persistent storage 308 of hypervisor computer 104 through communications unit 310 of hypervisor computer 104. VM template manifest repository 114, middleware/application manifest repository 116, middleware/application package management repository 118 and OS package management repository 120 may be downloaded to persistent storage 308 of server computer 106 through communications unit 310 of server computer 106. Template optimization program 122 may be downloaded to persistent storage 308 of server computer 108 through communications unit 310 of server computer 108.

I/O interface(s) 312 allows for input and output of data with other devices that may be connected to hypervisor computer 104, server computer 106 and/or server computer 108. For example, I/O interface(s) 312 may provide a connection to external device(s) 318 such as a keyboard, a keypad, a touch screen, point-of-sale hardware (e.g., credit card reader), and/or some other suitable input device. External device(s) 318 can also include portable computer-readable storage media such as, for example, thumb drives, portable optical or magnetic disks, and memory cards. Software and data used to practice embodiments of the present invention, for example, VM template directory 110 and hypervisor program 112 on hypervisor computer 104, can be stored on such portable computer-readable storage media and can be loaded onto persistent storage 308 of hypervisor computer 104 via I/O interface(s) 312. I/O interface(s) 312 also connect to a display 320. Software and data used to practice embodiments of the present invention, for example, VM template manifest repository 114, middleware/application manifest repository 116, middleware/application package management repository 118 and OS package management repository 120 on server computer 106, can be stored on such portable computer-readable storage media and can be loaded onto persistent storage 308 of server computer 106 via I/O interface(s) 312. I/O interface(s) 312 also connect to a display 320. Software and data used to practice embodiments of the present invention, for example, template optimization program 122 on server computer 108, can be stored on such portable computer-readable storage media and can be loaded onto persistent storage 308 of server computer 108 via I/O interface(s) 312. I/O interface(s) 312 also connect to a display 320.

Display 320 provides a mechanism to display data to a user and may be, for example, a computer monitor or a touch screen.

In embodiments, a service provider, such as a Solution Integrator, could offer to perform the processes described herein. In this case, the service provider may create, maintain, deploy, support, etc., the computer infrastructure that performs the process steps of the invention for one or more customers. In return, the service provider may receive payment from the customer(s) under a subscription and/or fee agreement.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for optimizing a virtual machine (VM) operating system (OS) template, the method comprising:
one or more processors obtaining a list of packages in an existing VM template, wherein a VM template is used as a starting point for a VM image build;
the one or more processors obtaining a list of packages required to be included in the existing VM template;
the one or more processors determining whether the list of packages in the existing VM template includes one or more prerequisite packages required to be included in the existing VM template, wherein a prerequisite package is a package on which one or more packages on the list of packages has a dependency and wherein the prerequisite package is used for updating the existing VM template;
responsive to determining the list of packages in the existing VM template does not include one or more prerequisite packages, the one or more processors updating the existing VM template to include the one or more prerequisite packages; and
the one or more processors removing one or more packages of the existing VM template that are not included in the list of packages required to be included in the existing VM template from the existing VM template.

2. The method of claim 1, further comprising the one or more processors updating the list of packages in the existing VM template to reflect the updating of the existing VM template.

3. The method of claim 1, wherein the step of the one or more processors determining whether the list of packages in the existing VM template includes one or more prerequisite packages required to be included in the existing VM template comprises the one or more processors determining that one or more packages of the list of packages required to be included in the existing VM template are not in the list of packages in the existing VM template.

4. The method of claim 1, wherein the step of the one or more processors updating the existing VM template comprises adding the one or more packages of the list of packages required to be included in the existing VM template that are not in the list of packages in the existing VM template to the existing VM template.

5. The method of claim 1, wherein the step of the one or more processors determining whether the list of packages in the existing VM template includes one or more prerequisite packages required to be included in the existing VM template further comprises the one or more processors determining that one or more packages of the list of packages required to be included in the existing VM template are a different version than the packages in the existing VM template.

6. The method of claim 1, wherein the step of the one or more processors updating the existing VM template comprises the one or more processors replacing the one or more packages in the existing VM template that are a different version than the one or more packages of the list of packages required to be included in the existing VM template with the one or more packages from the list of packages required to be included in the existing VM template.

7. The method of claim 1, wherein the step of the one or more processors determining whether the list of packages in the existing VM template includes one or more prerequisite packages required to be included in the existing VM template comprises the one or more processors determining that one or more packages in the existing VM template are not included in the list of packages required to be included in the existing VM template.

8. A computer program product for optimizing a virtual machine (VM) operating system (OS) template, the computer program product comprising:
one or more computer readable storage devices and program instructions stored on the one or more computer readable storage devices, wherein the one or more computer readable storage devices are hardware, the program instructions comprising:
program instructions to obtain a list of packages in an existing VM template, wherein a VM template is used as a starting point for a VM image build;
program instructions to obtain a list of packages required to be included in the existing VM template;
program instructions to determine whether the list of packages in the existing VM template includes one or more prerequisite packages required to be included in the existing VM template, wherein a prerequisite package is a package on which one or more packages on the list of packages has a dependency and wherein the prerequisite package is used for updating the existing VM template;
responsive to determining the list of packages in the existing VM template does not include one or more prerequisite packages, program instructions to update the existing VM template to include the one or more prerequisite packages; and
program instructions to remove one or more packages of the existing VM template that are not included in the list of packages required to be included in the existing VM template from the existing VM template.

9. The computer program product of claim 8, further comprising program instructions to update the list of packages in the existing VM template to reflect the updates of the existing VM template.

10. The computer program product of claim 8, wherein the program instructions to determine whether the list of packages in the existing VM template includes one or more prerequisite packages required to be included in the existing VM template comprises program instructions to determine that one or more packages of the list of packages required to be included in the existing VM template are not in the list of packages in the existing VM template.

11. The computer program product of claim 8, wherein the program instructions to update the existing VM template comprises adding the one or more packages of the list of packages required to be included in the existing VM template that are not in the list of packages in the existing VM template to the existing VM template.

12. The computer program product of claim 8 wherein the program instructions to determine whether the list of packages in the existing VM template includes one or more prerequisite packages required to be included in the existing VM template comprises program instructions to determine that one or more packages of the list of packages required to be included in the existing VM template are a different version than the packages in the existing VM template.

13. The computer program product of claim 8 wherein the program instructions to update the existing VM template comprises program instructions to replace the one or more packages in the existing VM template that are a different version than the one or more packages of the list of packages required to be included in the existing VM template with the one or more packages from the list of packages required to be included in the existing VM template.

14. The computer program product of claim 8 wherein the program instructions to determine whether the list of packages in the existing VM template includes one or more prerequisite packages required to be included in the existing VM template comprises program instructions to determine that one or more packages in the existing VM template are not included in the list of packages required to be included in the existing VM template.

15. A computer system for optimizing a virtual machine (VM) operating system (OS) template, the computer system comprising:
one or more computer processors;
one or more computer readable storage devices;
program instructions stored on the computer readable storage devices for execution by at least one of the one or more processors, the program instructions comprising:
program instructions to obtain a list of packages in an existing VM template;
program instructions to obtain a list of packages required to be included in the existing VM template, wherein a VM template is used as a starting point for a VM image build;
program instructions to obtain a list of packages required to be included in the existing VM template;
program instructions to determine whether the list of packages in the existing VM template includes one or more prerequisite packages required to be included in the existing VM template, wherein a prerequisite package is a package on which one or more packages on the list of packages has a dependency and wherein the prerequisite package is used for updating the existing VM template;
responsive to determining the list of packages in the existing VM template does not include one or more prerequisite packages, program instructions to update the existing VM template to include the one or more prerequisite packages; and
program instructions to remove one or more packages of the existing VM template that are not included in the list of packages required to be included in the existing VM template from the existing VM template.

16. The computer system of claim 15, wherein the program instructions to determine whether the list of packages in the existing VM template includes one or more prerequisite packages required to be included in the existing VM template comprises program instructions to determine that one or more packages of the list of packages required to be included in the existing VM template are not in the list of packages in the existing VM template.

17. The computer system of claim 15, wherein the program instructions to determine whether the list of packages in the existing VM template includes one or more prerequisite packages required to be included in the existing VM template comprises program instructions to determine that one or more packages of the list of packages required to be included in the existing VM template are a different version than the packages in the existing VM template.

* * * * *